(12) United States Patent
Powers et al.

(10) Patent No.: US 7,936,500 B2
(45) Date of Patent: May 3, 2011

(54) WAVELENGTH-SPECIFIC OPTICAL SWITCH

(75) Inventors: Richard M. Powers, Lakewood, CO (US); Wil McCarthy, Lakewood, CO (US)

(73) Assignee: RavenBrick LLC, Denver, CO (US)

( * ) Notice: Subject to any disclaimer, the term of this patent is extended or adjusted under 35 U.S.C. 154(b) by 533 days.

(21) Appl. No.: 12/040,570

(22) Filed: Feb. 29, 2008

(65) Prior Publication Data
US 2009/0059406 A1 Mar. 5, 2009

Related U.S. Application Data

(60) Provisional application No. 60/892,541, filed on Mar. 2, 2007.

(51) Int. Cl.
*G02F 1/35* (2006.01)
*G02B 27/00* (2006.01)
*H01L 29/06* (2006.01)

(52) U.S. Cl. .......... 359/326; 359/578; 359/579; 257/14; 250/226

(58) Field of Classification Search .......... 359/326, 359/578, 579; 250/226, 227.21; 257/14; 372/20
See application file for complete search history.

(56) References Cited

U.S. PATENT DOCUMENTS

| | | | |
|---|---|---|---|
| 5,013,918 A | 5/1991 | Choi | |
| 5,274,246 A | 12/1993 | Hopkins et al. | |
| 5,347,140 A | 9/1994 | Hirai et al. | |
| 5,530,263 A | 6/1996 | DiVincenzo | |
| 5,585,640 A | 12/1996 | Huston et al. | |
| 5,757,828 A | 5/1998 | Ouchi | |
| 5,763,307 A | 6/1998 | Wang et al. | |
| 5,881,200 A | 3/1999 | Burt | |
| 5,889,288 A | 3/1999 | Futatsugi | |
| 5,937,295 A | 8/1999 | Chen et al. | |
| 6,040,859 A | 3/2000 | Takahashi | |
| 6,240,114 B1 | 5/2001 | Anselm et al. | |
| 6,281,519 B1 | 8/2001 | Sugiyama et al. | |
| 6,294,794 B1 | 9/2001 | Yoshimura et al. | |
| 6,304,784 B1 | 10/2001 | Allee et al. | |
| 6,320,220 B1 | 11/2001 | Watanabe et al. | |

(Continued)

FOREIGN PATENT DOCUMENTS

EP 0851506 7/1998

(Continued)

OTHER PUBLICATIONS

Orlov, Alexei O., et al., Clocked Quantum-Dot Cellular Automata Devices: Experimental Studies, IEEE-NANO 2001, Oct. 30, 2001, pp. 425-430.

(Continued)

*Primary Examiner* — Audrey Y Chang
(74) *Attorney, Agent, or Firm* — Dorsey & Whitney LLP

(57) ABSTRACT

A wavelength-specific optical switch combines one or more tunable filters and bandblock reflectors such that the absorption or reflection of selected wavelength bands in the optical spectrum (visible, near infrared, or near ultraviolet) can be switched on and off. The wavelength switch is programmable, multifunctional, general-purpose, solid-state optical filter. The wavelength switch may serve as a tunable notch or bandblock filter, a tunable bandpass filter, a tunable highpass or lowpass filter, or a tunable band reflector. The wavelength switch has particular, but not exclusive, application in optics as a filter, band reflector, and as a means of isolating particular wavelengths or wavelength bands from a collimated light stream for transmission to, or rejection from, a sensor.

17 Claims, 7 Drawing Sheets

U.S. PATENT DOCUMENTS

| | | | |
|---|---|---|---|
| 6,329,668 B1 | 12/2001 | Razeghi | |
| 6,333,516 B1 | 12/2001 | Katoh et al. | |
| 6,437,361 B1 | 8/2002 | Matsuda | |
| 6,487,112 B1 | 11/2002 | Wasshuber | |
| 6,498,354 B1 | 12/2002 | Jefferson et al. | |
| 6,512,242 B1 | 1/2003 | Fan et al. | |
| 6,600,169 B2 | 7/2003 | Stintz et al. | |
| 6,611,640 B2 | 8/2003 | LoCasclo et al. | |
| 6,661,022 B2 | 12/2003 | Morie et al. | |
| 6,718,086 B1 * | 4/2004 | Ford et al. | 385/27 |
| 6,770,916 B2 | 8/2004 | Ohshima | |
| 6,777,718 B2 | 8/2004 | Takagi | |
| 6,816,525 B2 | 11/2004 | Stintz et al. | |
| 6,847,662 B2 * | 1/2005 | Bouda et al. | 372/20 |
| 6,946,697 B2 | 9/2005 | Pietambaram et al. | |
| 6,978,070 B1 | 12/2005 | McCarthy et al. | |
| 7,026,641 B2 | 4/2006 | Mohseni et al. | |
| 7,470,925 B2 | 12/2008 | Tamura et al. | |
| 7,601,946 B2 * | 10/2009 | Powers et al. | 250/226 |
| 7,768,693 B2 * | 8/2010 | McCarthy et al. | 359/326 |
| 2002/0080842 A1 | 6/2002 | An et al. | |
| 2002/0152191 A1 | 10/2002 | Hollenberg et al. | |
| 2002/0190249 A1 | 12/2002 | Williams et al. | |
| 2003/0059998 A1 | 3/2003 | Holonyak, Jr. et al. | |
| 2003/0066998 A1 | 4/2003 | Lee | |
| 2003/0107927 A1 | 6/2003 | Yerushalmi et al. | |
| 2004/0256612 A1 | 12/2004 | Mohseni et al. | |
| 2005/0157996 A1 | 7/2005 | McCarthy et al. | |
| 2005/0157997 A1 | 7/2005 | McCarthy et al. | |
| 2006/0011904 A1 | 1/2006 | Snyder et al. | |
| 2006/0049394 A1 | 3/2006 | Snyder et al. | |
| 2006/0151775 A1 | 7/2006 | Hollenberg et al. | |

FOREIGN PATENT DOCUMENTS

| | | |
|---|---|---|
| EP | 1198008 | 4/2002 |
| GB | 2261989 | 11/1991 |
| JP | 10-260381 | 9/1998 |
| JP | 2003-248204 | 9/2003 |
| KR | 10-2002-0013986 | 2/2002 |
| WO | PCT/AT98/00105 | 11/1998 |

OTHER PUBLICATIONS

Black, C.T., et al., "Integration of self-assembled diblock copolymers for semiconductor capacitor fabrication," Applied Physics Letters, vol. 79, No. 3 (Jul. 16, 2001), pp. 409-411, (American Inst. of Physics, NY).

Goldhaber-Gordon, David, et al., "Overview of Nanoelectronic Devices," Proceedings of the IEEE, vol. 85, No. 4, (Apr. 1997) pp. 521-533.

Kastner, Marc A., "Artificial Atoms," Physics Today (Jan. 1993), American Institute of Physics.

Kouwenhoven, Leo, et al., "Quantum Dots," Physics World, (Jun. 1988), pp. 35-39.

Leatherdale, C.A., et al., "Photoconductivity in CdSe Quantum Dot Solids," Physical Review B, vol. 62, No. 4, (Jul. 15, 2000) pp. 2669-2680.

McCarthy, Wil, "Once Upon a Matter Crushed," Science Fiction Age (Jul. 1999).

McCarthy, Wil, "Programmable Matter," Nature, vol. 407 No. 127, (Oct. 5, 2000).

McCarthy, Wil, "The Collapsium," Orion Books (2000).

Ryu, Du Yeol et al., "A Generalized Approach to the Modification of Solid Surfaces," Science, vol. 308 (Apr. 8, 2005), pp. 236-239.

Soh, Hyongsok T. et al., "Scanning Probe Lithography," Ch. 3, (2001) pp. 44-66 (Kluwer Academic Publishers).

Turton, Richard, "The Quantum Dot: A Journey into the Future of Microelectronics," Oxford University Press (1995).

Xu, Ting et al., "The Influence of Molecular Weight on Nanoporous Polymer Films," Polymer, 42 (Apr. 3, 2001), pp. 9091-9095 (Elsevier Science Ltd).

* cited by examiner

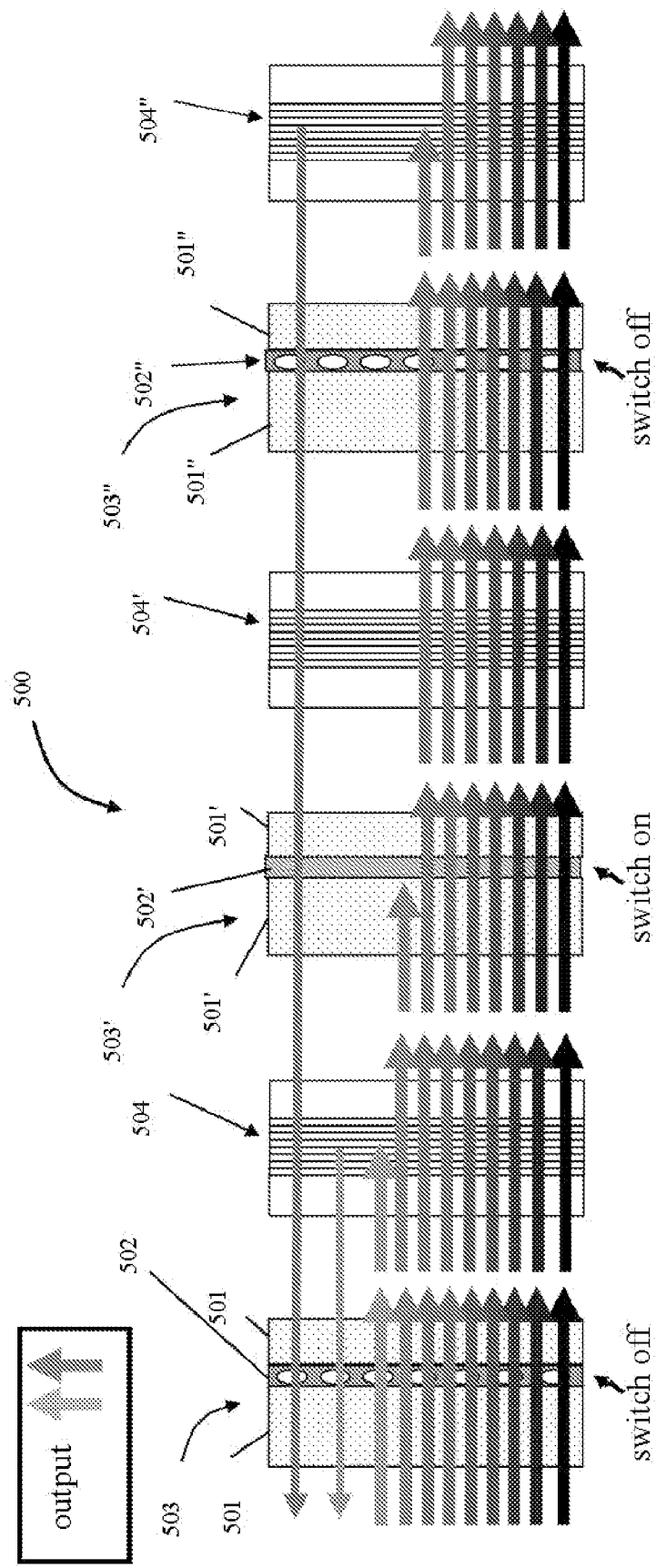

WAVELENGTH-SPECIFIC OPTICAL SWITCH

CROSS REFERENCE TO RELATED APPLICATIONS

This application claims the benefit of priority pursuant to 35 U.S.C. §119(e) of U.S. provisional application No. 60/892,541 filed 2 Mar. 2007 entitled "Wavelength-specific optical switch," which is hereby incorporated herein by reference in its entirety.

This application is related to U.S. Pat. No. 6,978,070 and its divisional application Ser. Nos. 11/081,777 and 11/081,778 (now U.S. Pat. No. 7,276,432), and to U.S. patent application Ser. Nos. 11/144,326, 11/145,417, and 11/676,785, each of which is hereby incorporated herein by reference. This application is also related to U.S. provisional patent application Nos. 60/825,385 and 60/825,405, each of which is hereby incorporated herein by reference.

BACKGROUND

This technology relates to optical switching devices incorporating tunable filters and bandblock reflectors. The tunable filters include devices (typically semiconductor devices) that produce quantum effects. For the purposes of this document, the term "optical" refers to visible, ultraviolet (UV), and infrared (IR) light which obey the normal rules of optics. By this definition, long-wavelength infrared, microwaves, radio waves, extreme ultraviolet, x-ray, and gamma radiation are not optical radiation. Optical filters and switches block light by absorbing or reflecting certain frequencies while allowing others to pass through. Short-pass and long-pass filters (specific to wavelength) or high-pass and low-pass filters (specific to frequency) may be used, or a narrow range of wavelengths/frequencies can be blocked by a notch filter or bandblock filter, or transmitted by a bandpass filter.

Semiconductors are capable of serving as filters in several ways. The optical response of a semiconductor is a function of its bandgap—a material-specific quantity. For photons with energies below the bandgap, the semiconductor is generally transparent, although material-specific absorption bands may also exist. Photons with energies higher than the bandgap are capable of creating electron-hole pairs within the semiconductor, and are therefore generally absorbed or reflected. For example, a material like gallium arsenide (GaAs) (bandgap ~1.424 eV) is transparent to infrared photons with a wavelength of 871 nm or greater, and opaque to visible light, whereas silicon dioxide ($SiO_2$) (bandgap ~9.0 eV) is transparent to visible and near-ultraviolet light with a wavelength greater than 138 nm. Thus, semiconductor materials are capable of serving as optical, infrared, or ultraviolet longpass filters.

A semiconductor material will also generally show a strong emission or luminescence peak at this bandgap energy or cutoff energy, i.e., when stimulated with an electrical current, or with absorbed photons of higher energy, the semiconductor material will emit photons at the cutoff energy as a result of electron-hole recombinations within the material. Photoluminescence (i.e., stimulating the material with high-frequency light and measuring the resulting fluorescence or emission spectrum) is therefore useful as a diagnostic tool to determine the quantum confinement energy of a quantum well and thus predict its optical properties. Strong absorption at and above the cutoff energy is also capable of generating photoelectric effects within the semiconductor as large numbers of electron-hole pairs are created.

The fabrication of very small structures to exploit the quantum mechanical behavior of charge carriers, e.g., electrons or electron "holes" is well established. Quantum confinement of a carrier can be accomplished by a structure whose dimension is less than the quantum mechanical wavelength of the carrier. Confinement in a single dimension produces a "quantum well," and confinement in two dimensions produces a "quantum wire." A "quantum dot" is a structure capable of confining carriers in all three dimensions. Some filters also incorporate quantum wells, quantum wires, or quantum dot particles as dopants (much as leaded crystal incorporates lead atoms or particles as dopants) to affect the behavior of the filter. However, the optical properties of such filters are fixed at the time of manufacture and are neither multifunctional nor programmable.

The energy of an electron confined in a quantum well is not only a function of bandgap, but of the quantum confinement energy, which depends on the thickness of the well and the energy height of the surrounding barriers (i.e., the difference in conduction band energy between the well and barrier materials). This "bandgap plus quantum confinement" energy moves the transparency of the material into shorter wavelengths. Thus, while a bulk GaAs sample emits and absorbs photons at approximately 870 nm, a 10 nm GaAs quantum well surrounded by $Al_{0.4}Ga_{0.6}As$ barriers has a 34 meV quantum confinement energy and thus shows the equivalent cutoff at approximately 850 nm. Therefore, for a given set of materials and a given reference temperature, the cutoff energy can be fixed precisely through the fabrication of a quantum well of known thickness. It should be noted, however, that the bandgap is a temperature-dependent quantity. As the temperature of a semiconductor decreases, its bandgap increases slightly. When the semiconductor is heated, the bandgap decreases.

Quantum dots can be formed as particles, with a dimension in all three directions of less than the de Broglie wavelength of a charge carrier. Quantum confinement effects may also be observed in particles of dimensions less than the electron-hole Bohr diameter, the carrier inelastic mean free path, and the ionization diameter, i.e., the diameter at which the quantum confinement energy of the charge carrier is equal to its thermal-kinetic energy. It is postulated that the strongest confinement may be observed when all of these criteria are met simultaneously. Such particles may be composed of semiconductor materials (for example, Si, GaAs, AlGaAs, InGaAs, InAlAs, InAs, and other materials) or of metals, and may or may not possess an insulative coating. Such particles are referred to in this document as "quantum dot particles."

A quantum dot can also be formed inside a semiconductor substrate through electrostatic confinement of the charge carriers. This is accomplished through the use of microelectronic devices of various designs, e.g., an enclosed or nearly enclosed gate electrode formed on top of a quantum well. Here, the term "micro" means "very small" and usually expresses a dimension of or less than the order of microns (thousandths of a millimeter). The term "quantum dot device" refers to any apparatus capable of generating a quantum dot in this manner. The generic term "quantum dot" (abbreviated "QD" in certain of the drawings herein) refers to the confinement region of any quantum dot particle or quantum dot device.

The electrical, optical, thermal, magnetic, mechanical, and chemical properties of a material depend on the structure and excitation level of the electron clouds surrounding its atoms and molecules. Doping is the process of embedding precise quantities of carefully selected impurities in a material in order to alter the electronic structure of the surrounding atoms for example, by donating or borrowing electrons from them, and therefore altering the electrical, optical, thermal, magnetic, mechanical, or chemical properties of the material. Impurity levels as low as one dopant atom per billion atoms of substrate can produce measurable deviations from the expected behavior of a pure crystal, and deliberate doping to levels as low as one dopant atom per million atoms of substrate are commonplace in the semiconductor industry, for example, to alter the conductivity of a semiconductor.

Quantum dots can have a greatly modified electronic structure from the corresponding bulk material, and therefore different properties. Quantum dots can also serve as dopants inside other materials. Because of their unique properties, quantum dots are used in a variety of electronic, optical, and electro-optical devices. Quantum dots are currently used as near-monochromatic fluorescent light sources, laser light sources, light detectors including infra-red detectors, and highly miniaturized transistors, including single-electron transistors. They can also serve as a useful laboratory for exploring the quantum mechanical behavior of confined carriers. Many researchers are exploring the use of quantum dots in artificial materials, and as dopants to affect the optical and electrical properties of semiconductor materials.

The embedding of metal and semiconductor nanoparticles inside bulk materials (e.g., the lead particles in leaded crystal) has occurred for centuries. However, an understanding of the physics of these materials has only been achieved comparatively recently. These nanoparticles are quantum dots with characteristics determined by their size and composition. These nanoparticles serve as dopants for the material in which they are embedded to alter selected optical or electrical properties. The "artificial atoms" represented by these quantum dots have properties which differ in useful ways from those of natural atoms. However, it must be noted that the doping characteristics of these quantum dots are fixed at the time of manufacture and cannot be adjusted thereafter.

Tunable filters rely on various mechanical principles such as the piezoelectric squashing of a crystal or the rotation or deformation of a lens, prism, or mirror, in order to affect the filter's optical properties. Most notable of these is the Fabry-Perot interferometer, also known as an "etalon." Like any mechanical device, such tunable filters are much more vulnerable to shock, vibration, and other related failure modes than any comparable solid-state device.

The addition of a mechanical shutter can turn an otherwise transparent material—including a filter—into an optical switch. When the shutter is open, light passes through easily. When the shutter is closed, no light passes. If the mechanical shutter is replaced with an electrodarkening material such as a liquid crystal, then the switch is "nearly solid state", with no moving parts except photons, electrons, and the liquid crystal molecules themselves. This principle is used, for example, in liquid crystal displays (LCDs), where the white light from a backdrop is passed through colored filters and then selectively passed through or blocked by liquid crystal materials controlled by a transistor. The result is a two-dimensional array of colored lights which form the pixels of a television or computer display.

A single-electron transistor (SET) is a type of switch that relies on quantum confinement. The SET comprises a source (input) path leading to a quantum dot particle or quantum dot device, and a drain (output) path exiting, with a gate electrode controlling the dot. With the passage of one electron through the gate path into the device, the switch converts from a conducting or closed state to a nonconducting or open state, or vice-versa. However, these devices are not designed to control the flow of optical energy (i.e., light).

Band reflectors may be constructed by a variety of different means. In general, a band reflector is a filter that consists of transparent materials of different indices of refraction or different dielectric constants, such that certain frequencies or frequency bands of light are strongly interfered with (reflected) while other frequencies pass through with minimal reflection or attenuation. Thus, a band reflector is highly transparent across a broad range of frequencies, and highly reflective within a narrow band of frequencies. Band reflectors are used, for example, as cavity mirrors in certain types of lasers.

Each of these optical filters, switches, and combinations described above are not programmable or multifunctional. That is, they always pass or block the exact same wavelengths/frequencies of light, which are determined at the time of manufacture and cannot be altered thereafter.

Thermochromic materials change their color (i.e., their absorption and reflection spectrum) in response to temperature. Liquid crystal thermometers and liquid crystal tunable filters (LCTFs) are based on this principle. Thermochromic plastics are sometimes incorporated into baby bathtubs, bottles, or drinking cups as a visual indicator of liquids that may be too hot or too cold for safety or comfort. Thermochromic paints are sometimes used to help regulate the temperature of objects or buildings under heavy sunlight.

The information included in this Background section of the specification, including any references cited herein and any description or discussion thereof, is included for technical reference purposes only and is not to be regarded as subject matter by which the scope of the invention is to be bound.

SUMMARY

This technology is directed to a programmable, multifunctional optical switch—hereinafter a "wavelength switch"—incorporating semiconductor materials as tunable filters and bandblock reflectors. Combinations of tunable filters and bandblock reflectors in optical devices as described herein produce the wavelength switch, which has particular, but not exclusive, application in optics as a general purpose tunable filter, a general purpose tunable band reflector, and as a means of singling out particular wavelengths or wavelength bands for transmission to, or rejection from, a sensor. Quantum-confined carriers serve as dopants within the surrounding semiconductor material and the functionality of the wavelength switch arises as a consequence of the resulting changes in the optical filtering properties of the semiconductor material. The specific optical functions described herein should not be construed as limiting in scope, but rather as explanatory examples to convey the nature and capabilities of the wavelength switch, which is both multifunctional and programmable and can therefore be used for a multiplicity of operations. This is analogous to a digital computer, whose nature can be fully understood without an exhaustive list of the calculations it can perform.

For the purposes of this document, the term "switch" includes both solid-state and mechanical optical devices for selectively blocking or permitting the flow of energy, and includes both digital switches (e.g., transistors and relays) and analog switches (e.g., tubes and rheostats). Furthermore, a valve for selectively blocking or regulating the flow of gases or fluids can be considered analogous to a switch so that, in principle, the two terms could be used interchangeably. It is also a feature of most switch types that they can be run in reverse. In other words, while a particular pathway may be identified as the source or input path, and another as the drain or output path, there is not generally any physical or operational barrier to reversing the roles of these two paths, so that energy flows through the device in the opposite direction.

In one implementation, the tunable filter may be a solid-state, electrically or thermally tunable, quantum confinement device composed of semiconductor materials. The tunable filter may include a semiconductor quantum confinement layer (e.g., a quantum well, an arrangement or layer of semiconductor quantum dot particles, or an arrangement or layer of quantum wires) surrounded by barrier materials, whether semiconducting, semi-insulating, or insulating. The effective bandgap of the quantum well may then be varied over an optical bandwidth by one of several methods, for example, the application of a uniform electric field, the use of a heater and/or thermoelectric cooler to alter the temperature of the quantum well, or the application of a nonuniform (e.g., two-dimensional periodic) electric field to section the quantum well into quantum dots. These variations in the effective bandgap of the quantum well alter the optical properties of the quantum well material, including the optical bandwidth, in predictable ways, yielding a tunable optical filter. However, other types of tunable filters could be used as well, including but not limited to etalon filters, liquid crystal tunable filters, thermochromic dye filters, or thermochromic semiconductor filters that do not rely on quantum confinement for their operation. The basic functioning of the wavelength switch is not affected by the exact form or operating principles of the tunable filter.

In one implementation, the band reflector may be a dielectric mirror, similar to the type employed in certain types of lasers. In its simplest form, the dielectric mirror may be an optical heterojunction, i.e., a film of transparent material with a particular dielectric constant deposited on top of a transparent substrate with a different dielectric constant, such that particular frequencies of light encounter strong interference while propagating through the interface, and thus are reflected. The range of wavelengths (or frequencies) reflected by the band reflector is known as the reflection band. In essence, this is the exact opposite of an antireflection coating. However, in the more general case a dielectric mirror may consist of multiple layers on top of a substrate. Numerous other forms of band reflectors exist, including Bragg mirrors, photonic crystals, and nano- or micro-patterned gratings. In fact, many standard reflective materials, for example, silvered and aluminized glass and chromed metal, are band reflectors. However, in many cases the reflection bands of such materials include the entire visible spectrum, as well as portions of the infrared and ultraviolet spectrum, and in general there are also absorption bands or reflection bands outside the desired reflection band. In other words, these materials may not be not transparent at all wavelengths (or in some cases, any wavelengths) outside the reflection band. In any case, the design of band reflectors is well understood in the prior art, and needs no further elaboration here.

The function of the band reflector (or "mirror") is to pass light with minimal attenuation, except within a particular frequency range where the light is strongly reflected. For example, a band reflector may be designed to reflect blue light (i.e., light between the wavelengths of 424 and 491 nm) while remaining transparent to the rest of the visible spectrum. Other band reflectors may be designed to reflect infrared or ultraviolet light, or to reflect the entire visible spectrum while remaining transparent to near infrared and near ultraviolet wavelengths.

With the wavelength switch, light (e.g., white light) passes through the tunable filter and then strikes the band reflector. When the tunable filter is adjusted such that it strongly attenuates all the light in the reflection band of a dielectric mirror reflector, no reflection occurs at the mirror and thus all light that strikes it passes through. Thus, the wavelength switch (i.e., the device comprising the tunable filter and the band reflector) is not observed to reflect any significant portion of the light that strikes it. However, when the tunable filter is adjusted to transmit light within the reflection band of the band reflector, that portion of the light is reflected by the band reflector and passes back through the tunable filter. Thus, the wavelength switch is observed to reflect those particular wavelengths, while transmitting all others.

The net effect is of a tunable optical band reflector or notch filter. For example, a tunable filter capable of transmitting or attenuating blue light, coupled with a band reflector designed to reflect blue light, forms a solid-state wavelength switch that either does or does not reflect the blue light incident upon it, based on the state of the tunable filter. This is useful, for example, in astronomy, to filter out unwanted wavelengths such as those produced by streetlights. Alternatively, it can be employed in protective optics for spacecraft sensors (e.g., star sensors), to guard them against damage from laser light.

In some embodiments, only one tunable filter/band reflector pair is employed in an optical device. In other embodiments, multiple filter/band reflector pairs, operating on different parts of the spectrum, may be arranged in a single optical device such that the spectral range of the total wavelength switch is divided up into bands, any one of which can be transmitted or reflected back, on demand, through appropriate adjustment of the tunable filters. This was previously achieved only through mechanical means, e.g., by placing rotating mirrors in the path of a prism. The present technology achieves the same effect in the solid state, with no moving parts. In addition, the wavelength switch allows selected frequencies to be separated from a stream of light without disrupting the collimation of the light. For example, it is possible to remove a single color of light from an image before it reaches an imaging sensor, without affecting the clarity of the image in other wavelengths. Finally, in some implementations optics may not be aligned on a single axis so that, for example, light of different colors can be separated out and directed to different sensors. Again, this is accomplished in the solid state, without moving parts.

The structure, composition, manufacture, and function of quantum dot particles generally are taught in U.S. Patent Application Publication No. 2003/0066998 by Lee et al., which is hereby incorporated by reference as though fully set forth herein. The structure, composition, manufacture, and function of exemplary quantum dot devices are taught in U.S. Pat. No. 5,889,288 to Futatsugi, which is hereby incorporated by reference as though fully set forth herein. The structure, composition and manufacture of addressable quantum dot arrays are taught in U.S. Pat. No. 6,978,070 to McCarthy et al. The wavelength switch reorganizes these principles and devices into a device for removing select wavelength bands from a stream of light, either to single them out for sensing or analysis or to prevent them from reaching a sensor, while allowing other wavelengths to pass normally. The quantum confinement layers, particles, wires, devices, or arrays employed by the wavelength switch may be of different design than those described by Lee et al., Futatsugi, and McCarthy et al., but the operating principles are essentially the same.

Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

FIG. 5 is a schematic representation of a second embodiment of a wavelength switch including multiple tunable filter and band reflector pairs.

DETAILED DESCRIPTION

The present invention is directed to the use of tunable optical filters and band reflectors to produce a wavelength-specific optical switching device, or "wavelength switch"—a device that is capable of switchably reflecting particular wavelength bands within the optical (visible, near infrared, and near ultraviolet) spectrum. A band reflector naturally reflects light at all wavelengths that occur within its wavelength reflection band. However, a tunable filter is used to control which wavelengths of light are allowed to reach the band reflector and thus which wavelengths are reflected.

Figure 1:
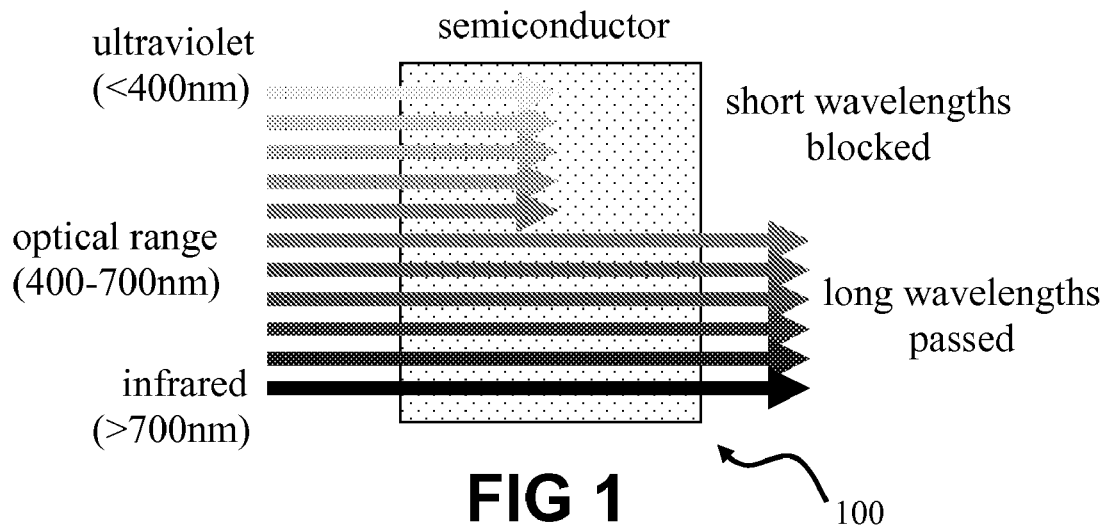
FIG. 1 is a schematic illustration of the natural optical filtering effects of a block of semiconductor material, which is generally transparent to photons at energies lower than the bandgap of the semiconductor, and opaque to photons at energies higher than the bandgap.

FIG. 1 is an illustration of the natural optical filtering effects of a block of semiconductor material 100. The block is generally transparent to photons at energies lower than the bandgap of the semiconductor material and opaque to photons at energies higher than the bandgap due to the absorption of the higher energy photons by electrons in the semiconductor material to excite the electrons across the bandgap. Thus, the material serves as a natural longpass filter. However, the bandgap is a temperature-sensitive quantity, so that the exact cutoff wavelength of the longpass filter changes as its temperature is varied, as further described below with respect to the tunable optical filter of FIG. 8.

Figure 2:
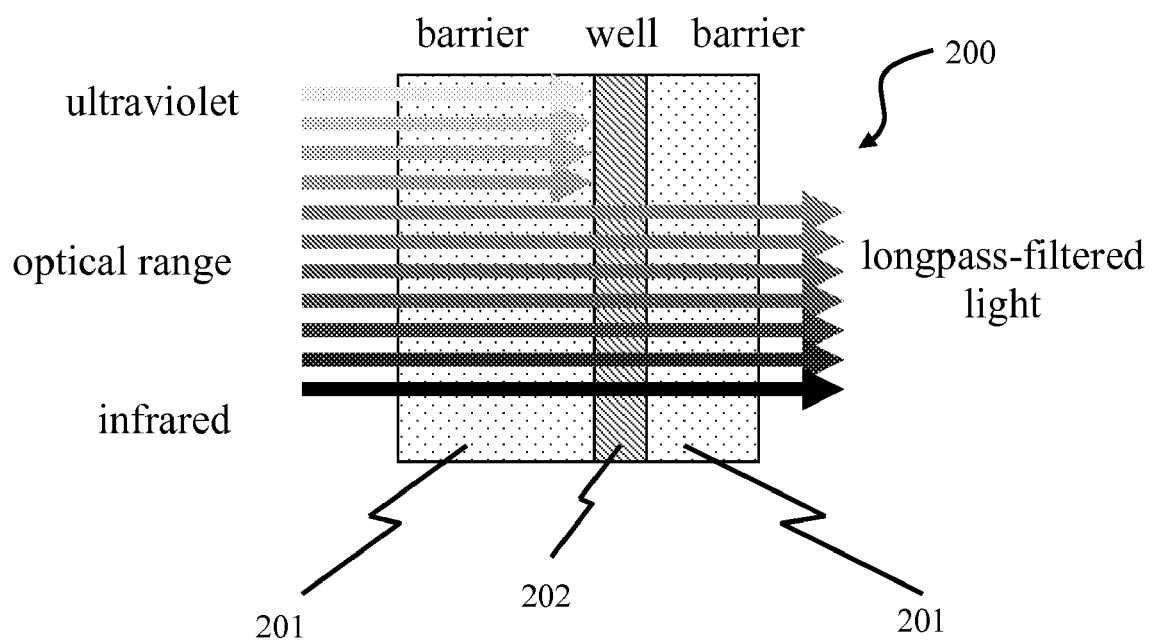
FIG. 2 is an illustration of the optical filtering effects of a semiconductor quantum well, which differ from those of a simple block of semiconductor.

FIG. 2 illustrates the same principle for a semiconductor 200 defining a quantum well. In this case, a quantum well layer 202 is surrounded by barrier layers 201 of a higher conduction energy, such that charge carriers are preferentially drawn into, and confined within, the quantum well layer 202 in the semiconductor 200. The effective bandgap of the quantum well layer 202 is equal to the bandgap of the material forming the quantum well layer 202, plus the charge carrier quantum confinement energy, which is a function of the thickness and composition of the quantum well layer 202, and of the energy "height" of the surrounding barrier layers 201. This semiconductor 200 also acts as a longpass filter. However, since the effective bandgap of a quantum well layer 202 is higher than that of an ordinary semiconductor, the quantum well 202 is transparent to photons of higher energy, and thus allows more wavelengths to pass through. Since the barrier layers 201 have an even higher conduction energy than the quantum well layer 202, they are transparent to still more wavelengths. Thus, filtering occurs primarily in the quantum well layer 202 rather than in the barrier layers 201, i.e., any wavelength capable of passing through the quantum well layer 202 is also, by definition, capable of passing through the barrier layers 201, whereas not all wavelengths that pass through the barrier layers 201 will also pass through the quantum well layer 202. Thus, in this case, the quantum well 202 itself is the filter while the barrier layers 201 serve as a transparent substrate for the quantum well 202.

Figure 3:
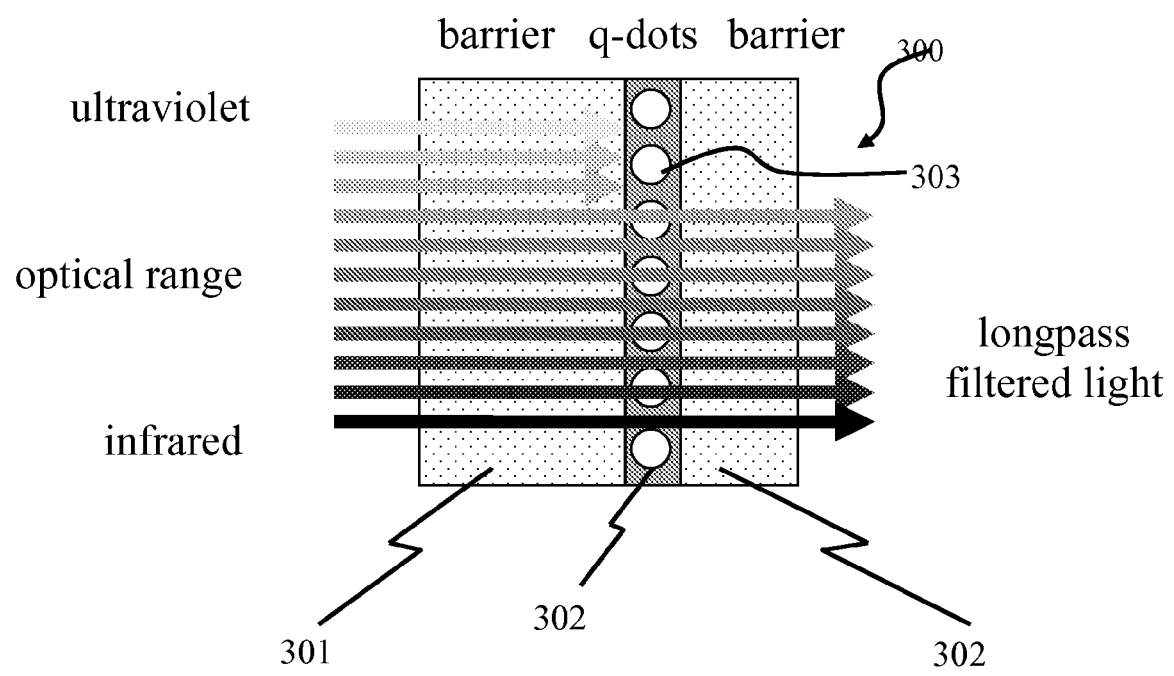
FIG. 3 is an illustration of the optical filtering effects of a layer of semiconductor quantum dots or quantum wires.

FIG. 3 illustrates the optical filtering properties of a quantum confinement layer 302 in a semiconductor filter 300 composed of quantum dot particles, quantum wires, or electrostatically confined quantum dots 303. Because the quantum confinement energy in the quantum confinement layer 302 is higher than for a simple quantum well, even more wavelengths are passed through the filter 300 in this case. However, as in FIG. 2, since the conduction energy of the barrier layers 301 is still higher than that of the quantum confinement layer 302, filtering occurs at the quantum confinement layer 302 and not in the barrier layers 301.

If the quantum confinement layer 302 (whether a quantum well or a layer or arrangement of quantum dot particles or quantum wires) is subjected to a uniform electric field (as described with respect to FIG. 7), or is subjected to controlled variations in temperature (as described with respect to FIG. 8), or is subjected to nonuniform electric fields (as described with respect to FIGS. 4A, 4B, and 9), then the bandgap and quantum confinement energy can be altered such that greater or fewer wavelengths of light are transmitted by the confinement layer 302. Thus, the quantum confinement layer 302 becomes capable of serving as a tunable longpass filter with an exact cutoff wavelength controlled within a range of possible cutoff wavelengths by external control signals.

Figure 4A:
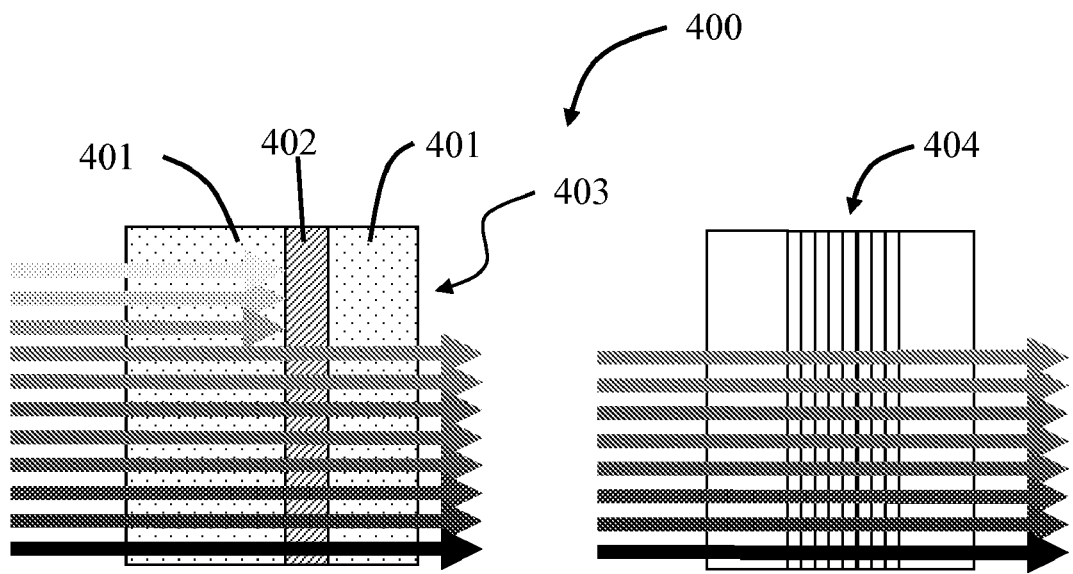
FIGS. 4A and 4B are schematic representations of one embodiment of a wavelength switch including a tunable filter and a band reflector.
Figure 4B:
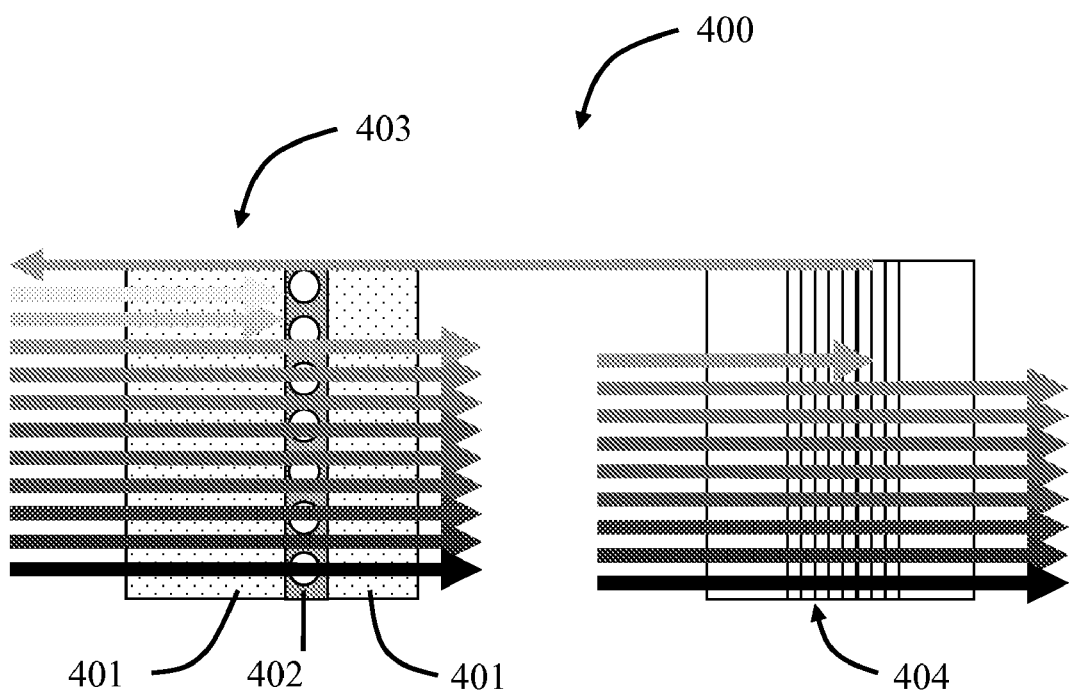

FIGS. 4A and 4B are schematic representations of a wavelength switch 400 in which a tunable filter 403 is formed by a quantum confinement layer 402 located on or within transparent substrates or barrier layers 401, and the whole arrangement is attached to, or placed adjacent to, a band reflector 404 which has been designed such that its reflection band covers the same range of wavelengths as the range of possible cutoff wavelengths for the quantum confinement layer 402. Thus, when the tunable filter 403 is in its ground state (see FIG. 4A), it blocks all wavelengths within the reflection band of the band reflector 404 from reaching the band reflector 404. As a result, the wavelength switch 400 transmits light within a particular range of wavelengths, and reflects none.

However, when the tunable filter 403 is in an excited state (see FIG. 4B), the cutoff wavelength is higher and thus the tunable filter 403 begins to transmit light within the reflection band of the band reflector 404. In this case, the wavelength switch 400 transmits light within one range of wavelengths and reflects light within another (generally narrower) range. The wavelength switch 400 may be configured such that, for example, in the ground state the wavelength switch 400 transmits red, orange, and yellow light, while blocking green, blue, and violet light, and in the excited state the wavelength switch 400 transmits red, orange, and yellow light, reflects green light, and blocks blue and violet light. Thus, through the application of external control signals, the reflection of green light can be switched on and off. The optical bandwidth of the tunable filter 403 is thus the range between the bandgap in the ground state and in the excited state.

FIG. 5 illustrates a more complex embodiment of a wavelength switch 500, wherein multiple tunable filters 503, 503', 503" and band reflector pairs 504, 504', 504" have been employed to extend the tunable range of the wavelength switch 500. From left to right, each tunable filter 503, 503', 503" has been designed to have a tunable range at longer wavelengths and thus lower energies and frequencies than the one before it. For example, the tunable range for the filter 503 may be more toward the blue/UV end of the spectrum than the range of filter 503', which occurs more toward the blue than the range of filter 503". In the preferred embodiment the edges of these tunable ranges match up, so that the tunable filters 503, 503, 503" collectively cover a broad, continuous region of the optical spectrum, although other embodiments exist in which this is not the case.

Similarly, the band reflectors 504, 504', and 504" are arranged from left to right such that each has a reflection band that occurs more toward the blue/UV end of the spectrum than its neighbor to the right, and each is transparent to optical wavelengths outside that reflection band. In one embodiment the edges of these reflection bands are contiguous, so that the band reflectors 504, 504', and 504" collectively cover a broad, continuous region of the optical spectrum, although other embodiments exist in which this is not the case.

In the exemplary configuration shown in FIG. 5, the first tunable filter 503 has a tunable range covering the blue portion of the spectrum. It is shown in its most excited state (i.e., filtration of selected wavelengths is "off"), and is transmitting blue, blue-green, green, yellow, orange, red, and infrared light while blocking indigo, violet and ultraviolet. The first band reflector 504 has been designed to reflect blue light while transmitting ultraviolet, violet, green, yellow, orange, red, and infrared light. However, indigo, violet and ultraviolet light are blocked by the tunable filter 503 and do not reach the band reflector 504 to be passed through.

The second tunable filter 503' in FIG. 5 has a tunable range covering the blue-green band of the optical spectrum. The second tunable filter 503' is shown in its ground state (i.e., filtration of selected wavelengths is turned "on"), and is transmitting green, yellow, orange, red, and infrared light while blocking blue-green, blue, indigo, violet, and ultraviolet. However, blue, indigo, violet, or ultraviolet light do not reach the filter 503' because they were previously blocked by the first tunable filter 503. The second band reflector 504' may be designed to reflect blue-green light and to transmit all other wavelengths. However, in this example no blue-green light reaches the second band reflector 504' because it is blocked at the second tunable filter 503', and no blue, indigo, violet, or ultraviolet light reach the reflector because they were previously blocked by the first tunable filter 503. Thus, the band reflector 504' reflects no light and transmits yellow, orange, red, and infrared light.

The third tunable filter 503" may have a tunable range covering the green portion of the spectrum. It is in its most excited state (i.e., filtration of selected wavelengths is turned "off") the third tunable filter 503" may transmit green, yellow, orange, red, and infrared light while blocking blue-green, blue, indigo, violet, and ultraviolet light. However, no blue-green, blue, indigo, violet, or ultraviolet light reaches the filter 503" because they were blocked by the first and second tunable filters 503, 503'. The third band reflector 504" may be designed to reflect green light and transmit all other wavelengths. However, in this example no wavelengths shorter than green will reach the third band reflector 504" because they have been blocked by the first, second, and third tunable filters 503, 503', 503". Thus, the third band reflector 504" reflects the green light, while transmitting yellow, orange, red, and infrared.

The net behavior of this exemplary implementation of a wavelength switch 500 is to reflect the blue and green light back toward the source, while absorbing blue-green light. In this exemplary embodiment, the wavelength switch 500 comprising all three tunable filter 503, 503', 503" and band reflector 504, 504', 504" pairs will always transmit yellow, orange, red, and infrared light, and will always block (i.e., absorb) indigo, violet, and ultraviolet light. However, depending on the states of tunable filters 503, 503' and 503", the wavelength switch 500 can be configured to reflect any or all of the wavelength bands comprising blue, blue-green, and green. Through careful selection of the ranges of the tunable filters 503, 503' and 503" and the reflection bands of the band reflectors 504, 504' and 504", the wavelength switch 500 can be designed to reflect other wavelengths upon switch control. In fact, a sufficiently large stack of tunable filter 503, 503' and 503" and band reflector 504, 504' and 504" pairs may be configured to reflect any band in the optical spectrum upon switch control.

Figure 6A:
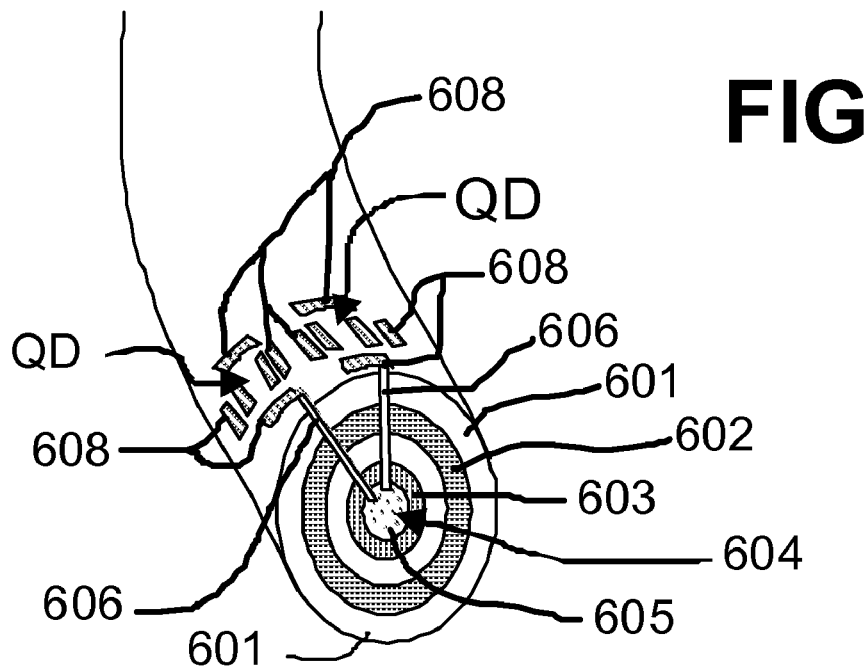
FIGS. 6A and 6B are schematic representations of one embodiment of a macroscopic, tunable, solid-state optical filter for use in the wavelength switch of FIGS. 4A and 4B comprising a multilayered microscopic fiber that includes a quantum well, surface electrodes, and control wires, which form quantum dot devices.
Figure 6B:
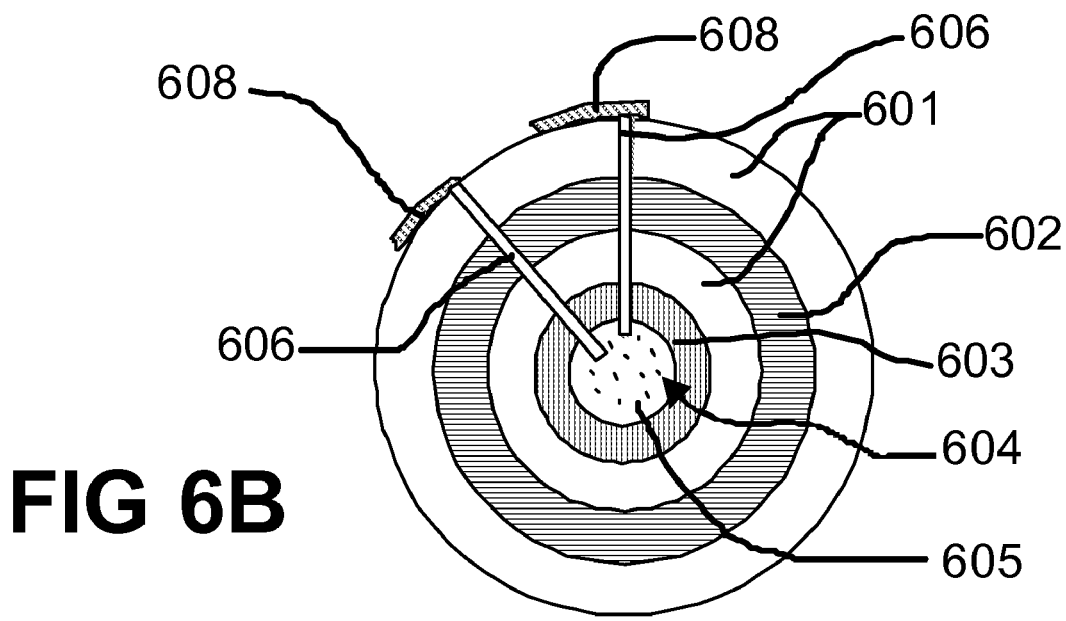

FIGS. 6A and 6B are schematic drawings of a macroscopic, tunable, solid-state optical filter for use in the wavelength switch of FIGS. 4A and 4B in the form of a multilayered microscopic fiber 600. The fiber 600 includes a quantum well and surface electrodes 608, which form quantum dot devices, and control wires 604 to carry electrical control signals to the electrodes. A plurality of these fibers may act as the macroscopic, tunable, solid-state optical filter. The control wires 604 may be contained in an insulating medium 605, surrounded by a quantum well, plus an optional memory layer 603. In one embodiment, the composition of the insulator 605 is a semiconductor oxide, although a variety of other materials could be used. The quantum well may be formed in a central or transport layer 602 of a semiconductor (similar to the negative layer of a P-N-P junction), for example, GaAs, surrounded by barrier or supply layers 601 of a semiconductor with higher conduction energy (similar to the positive layers of a P-N-P junction). Because of the difference in conduction energies, electrons "fall" preferentially into the lower energy of the transport layer 602, where they are free to travel horizontally (that is, within the layer) but are confined vertically (perpendicular to the layer) by the higher conduction energy of the barrier layers 601. However, the fiber 600 is not limited to this particular configuration, and may include quantum wells made from other materials and with other designs, as well as quantum wells designed to trap "holes" or other charge carriers.

The transport layer 602 of the quantum well must be smaller in thickness than the de Broglie wavelength of the charge carriers for the charge carriers to be confined within it. For an electron at room temperature, this would be approximately 20 nm. Thicker quantum wells are possible, although they will only exhibit quantum confinement of the charge carriers at temperatures colder than room temperature. Thinner quantum wells will operate at room temperature, and at higher temperatures so long as the de Broglie wavelength of the carriers does not exceed the thickness of the transport layer 602.

The surface of the fiber 600 may include conductors that serve as the electrodes 608 of the quantum dot device. These electrodes 608 confine charge carriers in the quantum well into a small space or quantum dot (QD) when a reverse-bias voltage is applied, since the negative charge on the electrodes 608 repels electrons, preventing their horizontal escape through the transport layer 602. The electrodes 608 may be powered by control wire branches 606 reaching to the surface of the fiber 600 from the control wires 604 in the center of the fiber 600. In one embodiment, the electrodes 608, control wires 604, and control wire branches 606 may be made of gold, although in principle they could be made of other metals, or other materials, such as semiconductors or superconductors.

Once the charge carriers are trapped in a quantum dot (QD), they form an artificial atom that is capable of serving as a dopant. Increasing the voltage on the electrodes 608 by a specific amount forces a specific number of additional charge carriers into the quantum dot (QD), altering the atomic number of the artificial atom trapped inside. Conversely, decreasing the voltage by a specific amount allows a specific number of carriers to escape to regions of the transport layer 602 outside the quantum dot (QD). In the embodiment of FIG. 6A, six electrodes 608 are provided for each quantum dot (QD), although more or less could be used. By selecting the voltages applied to these electrodes 608 it is possible to alter the repulsive electric field, thus affecting size and shape of the quantum dot (QD) confinement region. Changes to the confinement region similarly alter the size and shape of the artificial atom trapped inside the quantum dot (QD), either in conjunction with changes to the "atomic number" of the artificial atom or while holding the atomic number constant. Thus, the doping properties of the artificial atom are adjusted in real time through variations in the signal voltage of the control wires 604 at the center of the fiber 600.

There are various possibilities for making the multilayered microscopic fiber 600 of different materials, and in different configurations. The most advantageous configurations are the smallest, since smaller quantum dots can contain charge carriers at higher energies (shorter de Broglie wavelengths) and thus display atom-like behavior at higher temperatures. One exemplary fiber 600 would be similar in design to a single-electron transistor, although molecules the size of benzene rings or smaller, if employed as quantum dot particles, will be unable to hold large numbers of excess charge carriers. This limits their usefulness in generating artificial atoms. A somewhat larger but more practical design is to employ electrically conductive nanotubes, such as carbon nanotubes, as the control wire segments 604, and fullerene-type molecules, such as carbon fullerenes, as the quantum dot devices.

Figure 7:
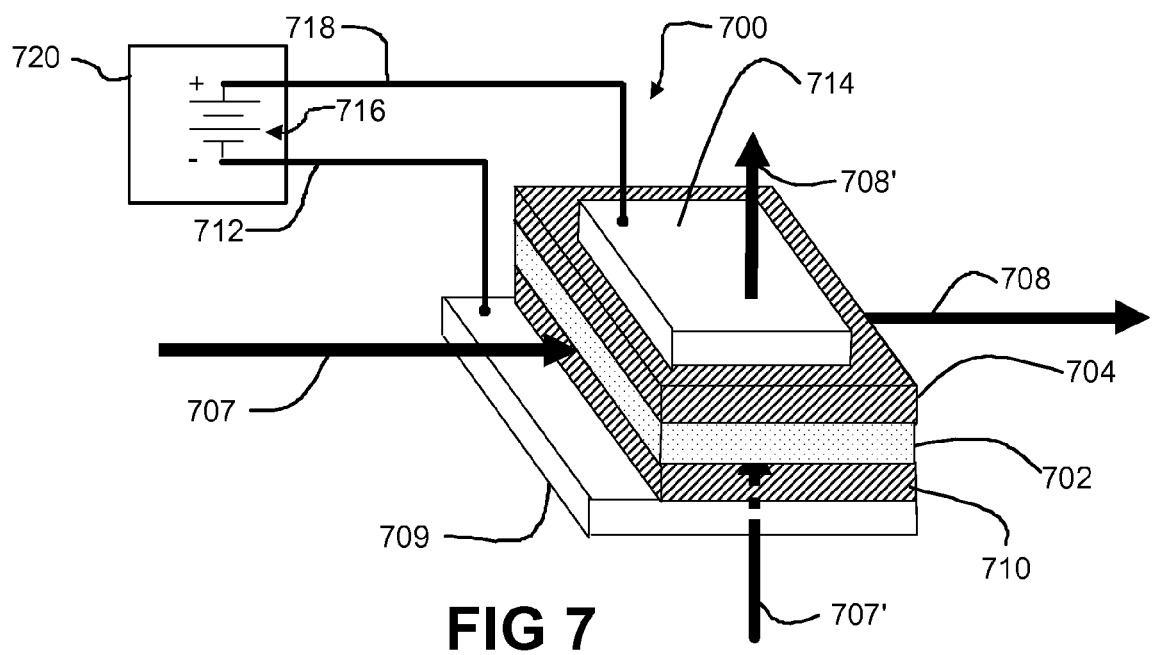
FIG. 7 is a schematic representation of another embodiment of a of a tunable, solid-state optical filter for use in the wavelength switch of FIGS. 4A and 4B comprising a quantum well to confine charge carriers in a two-dimensional layer, and an electrode to create an electric field across the quantum well to alter its quantum confinement properties via the Stark effect.

FIG. 7 illustrates tunable, solid-state optical filter for use in the wavelength switch of FIGS. 4A and 4B in the form of a quantum confinement device 700 that relies on the quantum-confined Stark effect. The device 700 comprises an upper barrier layer 704, a lower barrier layer 710, a transport layer 702, a surface electrode 714 connected with a control path 718 for control by a control unit 720, and a ground plane 709. Electrons or other carriers are confined in the vertical dimension by the barrier layers 704 and 710 of the quantum well, producing quantum confinement carrier behavior in that dimension and thus altering the effective bandgap. When the control path 718 is activated by an external voltage source 716 within the control unit 720, the ground plane 709 then drains to the negative side of the voltage source through the control return path 712. The resulting potential across the quantum well affects the quantum confinement energy of the trapped carriers, via the quantum Stark effect. This affects the optical properties of the transport layer 702, particularly in the vertical direction, and thus allows the transport layer 702 to serve as a tunable optical filter. Two possible paths 707, 707' are shown for incoming light, along with two possible output paths 708, 708' for filtered light along respective axes.

Figure 8:
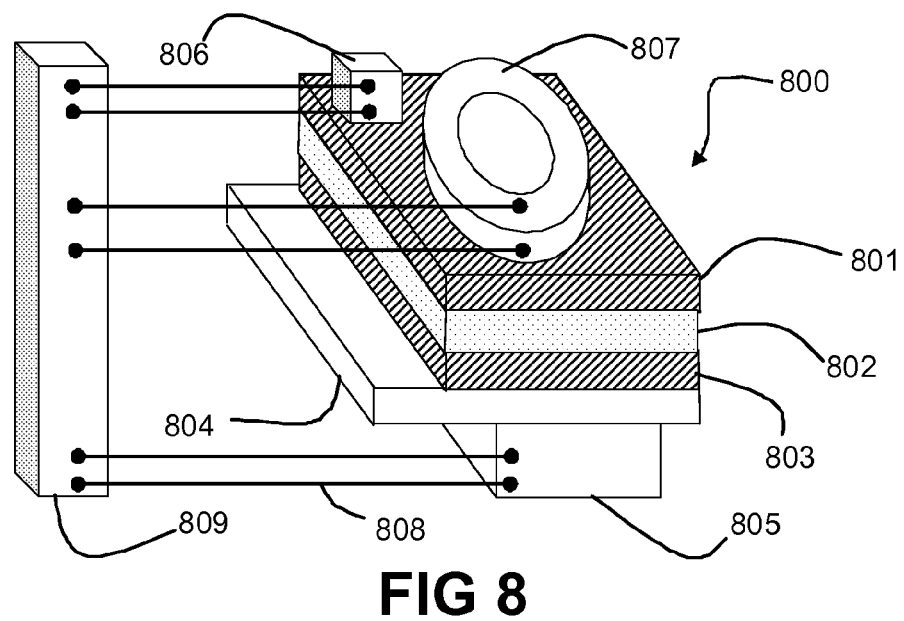
FIG. 8 is a schematic representation of a further embodiment of a tunable, solid-state optical filter for use in the wavelength switch of FIGS. 4A and 4B comprising a thermochromic quantum well surrounded by barrier layers, as well as a solid-state heater, thermoelectric cooler, and thermostat for controlling the temperature of the filter.

FIG. 8 is a schematic representation of a tunable, solid-state optical filter for use in the wavelength switch of FIGS. 4A and 4B in the form of a thermochromic filter 800, for example, incorporating a thermochromic quantum well as a longpass filter along with a temperature-regulating unit 809 that controls the temperature of the quantum well and therefore the bandgap. The thermochromic filter 800 includes barrier layers 801 and 803 surrounding a well layer 802 with a transparent substrate layer 804 providing structural support. In addition, attached to the thermochromic filter 800 are a heating device 805, a temperature sensor 806, and a cooling device 807.

The heating device 805, cooling device 807, and temperature sensor 806 are connected by wires 808 to a temperature-regulating unit 809, which reads the temperature of the quantum well and adjusts the output of the heating device 805 or cooling device 807 appropriately in order to keep the filter 800 at a particular desired temperature, and thus a particular cutoff wavelength. In one embodiment, the temperature-regulating unit 809 may be a solid-state thermostat or thermal control circuit.

Figure 9:
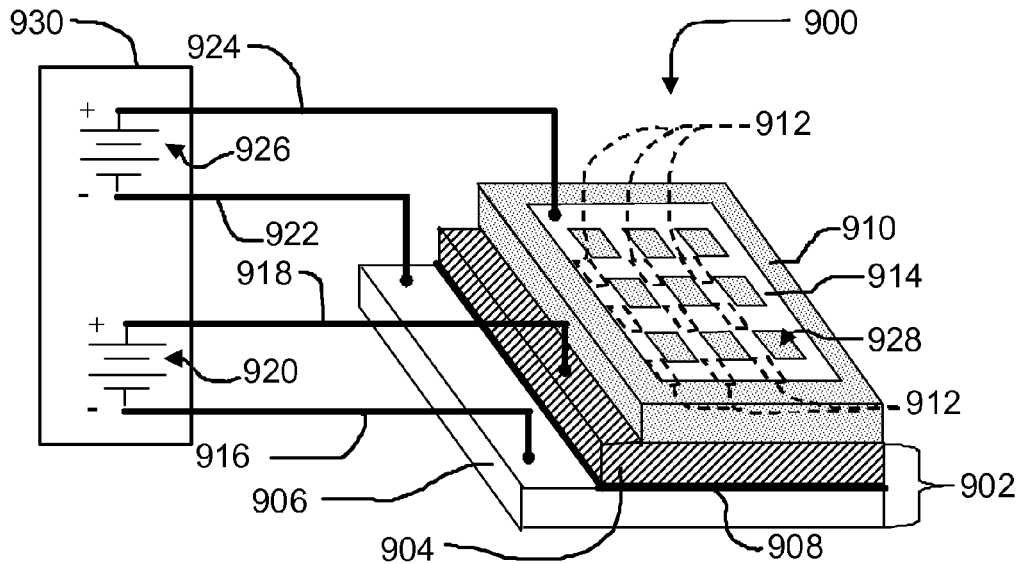
FIG. 9 is a schematic representation of yet another embodiment of a of a tunable, solid-state optical filter for use in the wavelength switch of FIGS. 4A and 4B, which uses a nonuniform electric field to divide a quantum well into an array of quantum dots by means of a charged, grid-shaped electrode.

FIG. 9 is a schematic representation of a tunable, solid-state optical filter for use in the wavelength switch of FIGS. 4A and 4B in the form of an arbitrary number of quantum dots 912 in a layered composite film 900. The film 900 is composed of an insulating layer 910, a transport layer 904, and a barrier layer 906. The transport layer 904 and the barrier layer 906 together form a heterojunction 902. Two independent voltages 920, 926 are controlled by a control unit 930 and four control wires 916, 918, 922, 924 connected thereto produce potentials across the entire film 900 and the heterojunction 902, respectively. A metal film on top of the insulating layer 910 may be fashioned into a grid electrode 914 with multiple openings 928. If the openings 928 are smaller than or comparable to the de Broglie wavelength of the confined carriers, then quantum confinement effects will be observed when the heterojunction 902 and the surface electrode 914 are charged. Specifically, one quantum dot 912 is formed in the gas layer 908 between the transport layer 904 and the barrier layer 906 beneath each opening 928 in the grid electrode 914. Thus, a plurality of artificial atoms are created in the layered composite film 900 corresponding to each opening 928 in the grid electrode 914. Because this alters the effective bandgap of the material, this device is once again capable of serving as a solid-state, tunable optical longpass filter.

While solid-state quantum confinement devices offer a number of advantages over other types of tunable filters, the wavelength switch may also be configured to incorporate any other sort of tunable filter, without altering the basic function of switching reflection on and off for particular wavelengths of light.

Figure 10:
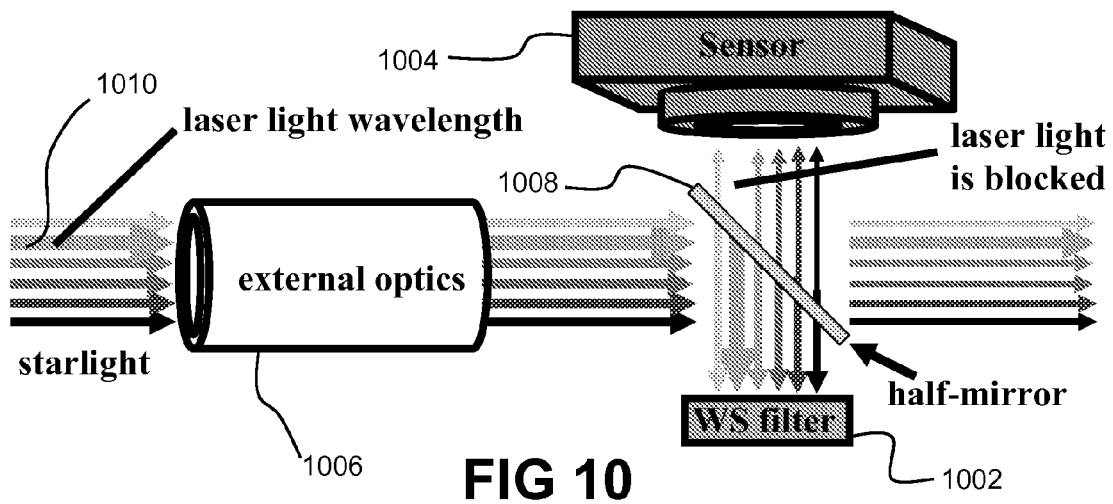
FIG. 10 illustrates an exemplary application for the wavelength switch of FIGS. 4A and 4B in which the wavelength switch is used to protect a star sensor against laser light.

FIG. 10 illustrates an exemplary implementation, wherein the wavelength switch 1002 is placed in the optical path of a satellite star sensor 1004 in order to protect the sensor from incoming laser light 1010. The wavelength switch 1002 may be positioned between the external optics 1006 and the star sensor 1004 by a half-silvered mirror 1008 (transmission ~50%, reflection ~50%). The star sensor 1004 may be protected by switching on a reflection band in the wavelength switch 1002 for the wavelength of the laser light 1010. The wavelength switch 1002 is actually a stack of several pairs of tunable filters and band reflectors, each pair acting over a different range of wavelengths, similar to the configuration of tunable filters and band reflectors presented in FIG. 5. The shortest wavelengths are reflected by the top tunable filter/band reflector pair, and the longest wavelengths are reflected by the bottom tunable filter/band reflector pair. The particular wavelength of the laser may be notched out by a middle tunable filter/band reflector pair, wherein the band reflector has been adjusted to leave a window across the laser wavelength. Numerous other uses exist for the wavelength switch 1002, and this example should in no way be construed as limiting the scope of possible applications.

From the description above, the wavelength-specific optical switching device, or wavelength switch, may be understood to provide a number of capabilities which were not previously possible. First, the wavelength switch provides a solid-state means of removing or isolating certain wavelengths from a stream of incoming light, thus serving as a tunable optical notch filter, bandblock filter, bandpass filter, longpass filter, shortpass filter, or band reflector. Second, the wavelength switch may provide a means of removing, attenuating, or manipulating individual wavelength bands from a collimated stream of light (e.g., an image) without destroying the collimation of either the original stream or the separated wavelengths.

Also from the above description, several advantages of the wavelength switch become evident. The wavelength switch provides a solid-state, tunable filter that is capable of acting in both a transmissive and a reflective mode. In addition, the wavelength switch is useful in protective optics, e.g., to prevent laser light from reaching a human eye or other delicate sensors. The wavelength switch also offers a solid-state, purely optical means of separating a light stream into multiple, independent streams (e.g., red, green, and blue images extracted from a full-color scene), without the need for digital or analog signal processing. The wavelength switch may also be useful in remote sensing, e.g., as a way of breaking a scene into separate images for each wavelength band in order to enhance subtle details that are not apparent in a full-spectrum image.

The wavelength switch may also be combined with other optical components (including lenses, mirrors, half-mirrors, light sources, lasers, films, and gratings) to produce a wide variety of switchable optical effects. Such effects may include, but are not limited to, band-switchable amplification, attenuation, transmission, diversion, rotation, acceleration, shifting, reflection, absorption, delay, echo or repetition, inversion, limiting or clipping, distortion, purification or filtering, regulation, reshaping, reallocation, oscillation, identification or characterization, and storage of optical signals.

The wavelength switch can be combined with other optical components to produce desired optical effects that either were not previously possible, could not be done in the solid state, or could not be done as conveniently. The wavelength switch can be used as a multifunctional, programmable, general-purpose, solid-state optical filter and band reflector that combines in a single device the capabilities of a wide variety of static optical components available on demand. In other words, the wavelength switch becomes an important new component in the tool kit of optical design engineers.

Although the description above contains many specificities, these should not be construed as limiting the scope of the invention but rather construed as merely providing illustrations of certain exemplary embodiments of this invention. There are various possibilities for making the wavelength switch of different materials, and in different configurations. A number of optional components may also be added, including air gaps or vacuum gaps, transparent substrates or spacer materials, adhesives, mounting brackets, antireflection coatings, lenses, gratings, polarizers, and static (i.e., non-tunable) optical filters or reflectors. Numerous other variations exist which do not affect the core principles of the operation of the wavelength switch. For example, the band reflectors may be oriented at an angle to the incoming light stream, or may be mounted such that they can be mechanically reoriented, or may be fitted with adjustable gratings or other components such that they behave optically as though they were rotated.

Although various embodiments of this invention have been described above with a certain degree of particularity, or with reference to one or more individual embodiments, those skilled in the art could make numerous alterations to the disclosed embodiments without departing from the spirit or scope of this invention. All directional references e.g., proximal, distal, upper, lower, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. An optical device that switches between reflection and absorption of wavelength bands in a tunable range comprising
   a tunable optical filter comprising a thermochromic filter that selectively transmits or absorbs light in one or more wavelength bands within an optical bandwidth; and
   a band reflector that reflects light selectively transmitted by the tunable optical filter within the one or more wavelength bands;
   a control unit that sends control signals to the tunable optical filter to select between transmission or absorption of the one or more wavelength bands, wherein the control unit further comprises
      a heating device coupled with the thermochromic filter;
      a cooling device coupled with the thermochromic filter;
      a temperature sensor coupled with the thermochromic filter; and
      a temperature regulating unit connected to each of the heating device, the cooling device, and the temperature sensor,
   wherein the temperature regulating unit receives temperature data from the temperature sensor and sends control signals to the heating device and the cooling device to adjust the temperature of the thermochromic filter and thereby select between transmission or absorption of the one or more wavelength bands.

2. The optical device of claim 1, wherein the tunable optical filter further comprises a quantum confinement layer having a light transmission range determined by an effective bandgap in a ground state and in a state of maximum excitation that defines bounds of the optical bandwidth.

3. The optical device of claim 2, wherein the quantum confinement layer is formed by a quantum dot device.

4. The optical device of claim 1, wherein the tunable optical filter and the band reflector are aligned along a single axis.

5. The optical device of claim 1, wherein
the tunable optical filter and the band reflector are aligned on separate axes; and
the optical device further comprises optics to remove selected wavelengths from a collimated light stream output from the optical device.

6. The optical device of claim 1 further comprises
a plurality of pairs of the tunable optical filter and the band reflector, wherein the pairs transmit or reflect light, or both, in different respective wavelength bands and operate conjointly to expand the tunable range.

7. The optical device of claim 1, wherein the optical device is configured to switchably reflect or absorb a single wavelength band.

8. The optical device of claim 1, wherein the optical device is configured to switchably reflect or absorb a plurality of wavelength bands independently from one another.

9. The optical device of claim 1, wherein the optical device is configured to function as one or more of a notch filter, a bandblock filter, a bandpass filter, a longpass filter, or a shortpass filter.

10. A method for switching between reflection and absorption of wavelength bands in a tunable range comprising
receiving a control signal to determine selection between transmission or absorption of light in one or more wavelength bands within an optical bandwidth;
selectively transmitting or absorbing light in the one or more wavelength bands in response to the control signal by using a thermochromic filter, which operations further comprise
receiving temperature information from the thermochromic filter; and
heating and cooling the thermochromic filter to adjust a temperature of the thermochromic filter and thereby select between transmission or absorption of the one or more wavelength bands; and
reflecting light transmitted within the one or more wavelength bands.

11. The method of claim 10, wherein the operation of selectively transmitting or absorbing light further performed by a tunable optical filter that includes the thermochromic filter.

12. The method of claim 11, wherein the tunable optical filter comprises a quantum confinement layer having a light transmission range determined by an effective bandgap in a ground state and in a state of maximum excitation of the quantum confinement layer that defines bounds of the optical bandwidth.

13. The method of claim 10, wherein the thermochromic filter further comprises a quantum confinement device having a light transmission range determined by an effective bandgap in a ground state and in a state of maximum excitation of the quantum confinement device that defines bounds of the optical bandwidth.

14. An optical device that switches between reflection and absorption of wavelength bands in a tunable range comprising
a plurality of tunable optical filters that selectively transmit or absorb light in a plurality of respective wavelength bands within an optical bandwidth, wherein at least one of the tunable optical filters further comprises a thermochromic filter;
a plurality of band reflectors, wherein each band reflector is paired with a respective tunable optical filter and reflects light selectively transmitted by the respective tunable optical filter within the respective wavelength bands; and
a control unit that sends control signals to the plurality of tunable optical filters to select between transmission or absorption of the respective wavelength bands, wherein the control unit further comprises
a heating device coupled with the thermochromic filter;
a cooling device coupled with the thermochromic filter;
a temperature sensor coupled with the thermochromic filter; and
a temperature regulating unit connected to each of the heating device, the cooling device, and the temperature sensor,
wherein the temperature regulating unit receives temperature data from the temperature sensor and sends control signals to the heating device and the cooling device to adjust the temperature of the thermochromic filter and thereby select between transmission or absorption of the one or more wavelength bands.

15. The optical device of claim 14, wherein one or more of the tunable optical filters comprises a quantum confinement layer having a light transmission range determined by an effective bandgap in a ground state and in a state of maximum excitation that defines bounds of the optical bandwidth.

16. The optical device of claim 15, wherein the quantum confinement layer is formed by a quantum dot device.

17. The optical device of claim 14, wherein the optical device is configured to switchably reflect or absorb the plurality of wavelength bands independently from one another.

* * * * *